(12) United States Patent
Brulin et al.

(10) Patent No.: US 11,873,257 B2
(45) Date of Patent: Jan. 16, 2024

(54) BORON CARBIDE AND SILICON CARBIDE ARMOUR

(71) Applicant: SAINT-GOBAIN CENTRE DE RECHERCHES ET D'ETUDES EUROPEEN, Courbevoie (FR)

(72) Inventors: Jérôme Brulin, Saint-Martin-de-Crau (FR); Jérôme Sant, Les Angles (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 152 days.

(21) Appl. No.: 17/632,660

(22) PCT Filed: Jul. 31, 2020

(86) PCT No.: PCT/EP2020/071719
§ 371 (c)(1),
(2) Date: Feb. 3, 2022

(87) PCT Pub. No.: WO2021/023671
PCT Pub. Date: Feb. 11, 2021

(65) Prior Publication Data
US 2022/0274885 A1 Sep. 1, 2022

(30) Foreign Application Priority Data
Aug. 5, 2019 (FR) ...................................... 1908958

(51) Int. Cl.
*C04B 35/563* (2006.01)
*C04B 35/565* (2006.01)
(Continued)

(52) U.S. Cl.
CPC .......... *C04B 35/563* (2013.01); *C04B 35/565* (2013.01); *C04B 35/6264* (2013.01);
(Continued)

(58) Field of Classification Search
CPC . C04B 35/563; C04B 35/565; C04B 35/6264; C04B 35/64
(Continued)

(56) References Cited

U.S. PATENT DOCUMENTS 3,796,564 A 3/1974 Taylor et al.
4,415,632 A * 11/1983 Luhleich ............... F41H 5/0421
428/408
(Continued)

FOREIGN PATENT DOCUMENTS

EP 2 998 282 A1 3/2016
FR 3053776 A1 * 1/2018 ........... C04B 35/565
(Continued)

OTHER PUBLICATIONS

International Search Report as issued in International Patent Application No. PCT/EP2020/071719, dated Oct. 22, 2020.

*Primary Examiner* — Samir Abdosh
(74) *Attorney, Agent, or Firm* — Pillsbury Winthrop Shaw Pittman LLP

(57) ABSTRACT

An antiballistic armor-plating component, includes a ceramic body made of a material including, as percentages by volume, between 20% and 75% of boron carbide, between 5% an d 30% of a metallic silicon phase or of a metallic phase including silicon and between 20% and 70% of silicon carbide and wherein, as percentages by volume: more than 60% of the grains with an equivalent diameter greater than 60 micrometers are boron carbide grains, the boron carbide grains with an equivalent diameter greater than 30 micrometers represent more than 20%, the silicon carbide grains with an equivalent diameter greater than or equal to 10 micrometers represent more than 10%, the silicon carbide grains with an equivalent diameter less than 10 micrometers represent more than 10%.

20 Claims, 1 Drawing Sheet

(51) Int. Cl.
*C04B 35/626* (2006.01)
*C04B 35/64* (2006.01)
*C04B 35/657* (2006.01)
*F41H 5/04* (2006.01)

(52) U.S. Cl.
CPC ............ *C04B 35/64* (2013.01); *C04B 35/657* (2013.01); *F41H 5/0414* (2013.01); *C04B 2235/3821* (2013.01); *C04B 2235/3826* (2013.01); *C04B 2235/428* (2013.01); *C04B 2235/604* (2013.01); *C04B 2235/6581* (2013.01); *C04B 2235/782* (2013.01); *C04B 2235/786* (2013.01)

(58) Field of Classification Search
USPC ........................................................ 89/36.02
See application file for complete search history.

(56) References Cited

U.S. PATENT DOCUMENTS

| | | |
|---|---|---|
| 4,604,249 A | 8/1986 | Luhleich et al. |
| 6,609,452 B1 | 8/2003 | McCormick et al. |
| 6,862,970 B2 * | 3/2005 | Aghajanian ........ C04B 35/62655 89/36.02 |
| 2013/0168905 A1 * | 7/2013 | Anderson ........... C04B 40/0089 264/643 |
| 2023/0258434 A1 * | 8/2023 | Brulin .................. F41H 5/0442 89/36.02 |

FOREIGN PATENT DOCUMENTS

| | | | | |
|---|---|---|---|---|
| IL | 188517 A | 2/2016 | | |
| JP | 2005-247622 A | 9/2005 | | |
| WO | WO-2016097661 A1 * | 6/2016 | ......... | B01D 46/2418 |
| WO | WO-2019132667 A1 * | 7/2019 | ........... | C01B 32/956 |
| WO | WO-2021123683 A1 * | 6/2021 | .............. | B32B 1/08 |

* cited by examiner

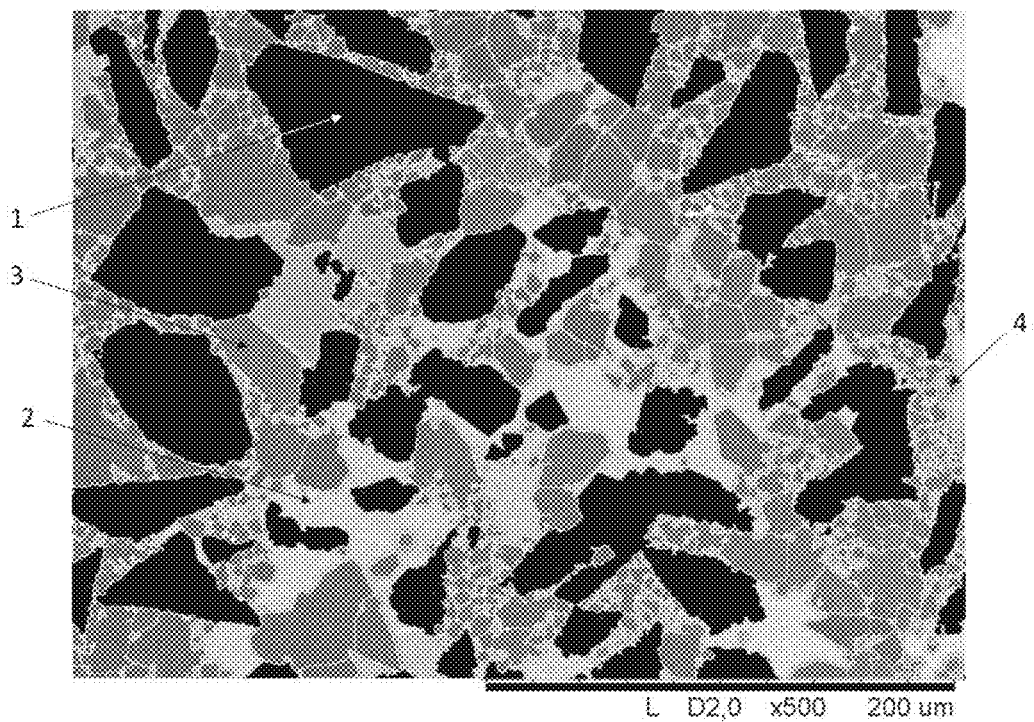

BORON CARBIDE AND SILICON CARBIDE ARMOUR

CROSS-REFERENCE TO RELATED APPLICATIONS

This application is the U.S. National Stage of PCT/EP2020/071719, filed Jul. 31, 2020, which in turn claims priority to French patent application number 1908958 filed Aug. 5, 2019. The content of these applications are incorporated herein by reference in their entireties.

The invention relates to products whose antiballistic properties are high enough to justify their use in armor or armor-plating components.

The invention is in particular applicable to armor or armor-plating components that make it possible to protect people, (land, sea or air) vehicles or fixed installations (in particular buildings, enclosure walls or guard posts).

In particular, the additional weight linked to wearing armor plating is an essential element, whether it concerns the protection of people but also with regard to vehicles, for which excessive weight is an obstacle to rapid movement and limits their radius of action.

In particular, systems are known that are formed by the "mosaic" assembling of ceramic parts having a given polygonal shape and that are individually resistant to the impact of a projectile. JP2005247622 describes, for example, an arrangement of such shapes 20 to 100 mm in width, for a thickness of a few mm. This type of mosaic of parts has the advantage of withstanding successive shots ("multi-shot" or "multi-hit" protection).

Other systems, referred to as monolithic systems, exist, these systems being formed of one piece or else of a very limited number of pieces having a large area, each monolith having an impact area that is larger than 100 cm$^2$, thereby decreasing the number of joints.

A number of materials have been proposed for forming armor intended for people, the ratio of armor-plating mass to protective area of which must remain low, typically lower than 50 kg/m$^2$, or non-personnel armor plating intended for vehicles or for fixed installations, the ratio of mass to protective area (or surface density) of which is typically higher than 50 kg/m$^2$.

Metals and alumina are commonly used as armor plating but they have a high surface density.

More recently, products based on non-oxide ceramic have been proposed, of which the mass to armor-plating area or surface density at equivalent impact resistance is lower.

Porous SiC products that can be used as armor plating are known, for example, from U.S. Pat. Nos. 4,604,249 or 4,415,632.

Also known are armors made of a composite ceramic material formed of fine grains of boron carbide bound by a silicon carbide matrix obtained by reactive sintering, in particular by impregnation of molten silicon.

U.S. Pat. No. 3,796,564 and then U.S. Pat. No. 3,857,744 or IL188517 disclose, for example, methods of manufacturing a reaction bonded B4C composite armor consisting in pressing a part from a mixture of B4C grains of 1 to 120 micrometers and resin or a carbon precursor, then infiltrating this part with molten silicon between 1440° C. and 2200° C. under vacuum or under an inert atmosphere. The final product is a composite comprising grains of boron carbide in a silicon matrix that includes silicon carbide obtained by reacting a portion of the molten silicon with the boron carbide and the carbon of the resin. This type of product is difficult to manufacture because the production process is complex. In particular due to the strong reaction of molten silicon with the B$_4$C Grains on the one hand (leading in particular to a secondary B$_{12}$(B, C, Si)$_3$ boron carbide phase) and with the free carbon on the other hand (leading in particular to a β-SiC phase). It was more recently proposed by US 2013/0168905 A1 to infiltrate the preform with silicon and boron.

Other patents, such as for example U.S. Pat. Nos. 6,609,452B1 or 6,862,970B2, have proposed other solutions, but these are armors comprising SiC grains bonded by a metallic silicon phase. The ballistic performance of this type of composite with a similar surface density appeared to be lower than a composite with B$_4$C grains bonded by a metallic silicon phase.

There is therefore a continual need to improve the products used as armor plating, this improvement being measured in particular by their ballistic performance. The object of the present invention is therefore to provide a boron carbide material bound by a matrix comprising essentially metallic silicon or a metallic silicon alloy and silicon carbide grains, the ballistic performance of which is improved.

In particular, there is today a need for armor plating capable of withstanding perforation with respect to projectiles having high kinetic energy while having a low bulk density, typically less than 3.1 g/cm$^3$ or less than 3.0 g/cm$^3$, in order to protect people or (land, sea or air) vehicles or fixed installations, such as buildings.

According to a first general aspect, the present invention relates to an antiballistic armor-plating component, preferably having an impact area, in particular that is flat or curved, and comprising a ceramic body made of a material described as hard. The ceramic body is generally provided on its inner face or face opposite the impact face with an energy-dissipating back coating, preferably made of a material of lower hardness than that of the material constituting the ceramic body.

More specifically, the present invention relates to an antiballistic armor-plating component, comprising a ceramic body made of a material comprising, as percentages by volume:
- between 20% and 75% of boron carbide,
- between 5% and 30% of a metallic silicon phase or of a metallic phase comprising silicon,
- between 20% and 70% of silicon carbide, and wherein, as percentages by volume of said material:
- more than 60% of the grains with an equivalent diameter greater than 60 micrometers are boron carbide grains,
- the boron carbide grains with an equivalent diameter greater than 30 micrometers represent more than 20%, preferably more than 25%, or more than 27%,
- the silicon carbide grains with an equivalent diameter greater than or equal to 10 micrometers represent more than 10%,
- the silicon carbide grains with an equivalent diameter less than 10 micrometers represent more than 10%, preferably more than 15%.

According to the invention, the metallic phase is advantageously present between the grains of boron carbide and of silicon carbide. As indicated above, the metallic phase comprises silicon and more preferably is based on silicon. In particular, it preferably comprises more than 50 at % of silicon, preferably more than 80% or even more than 90% of silicon atoms. More preferably, the metallic phase consists essentially of silicon, or consists solely of silicon, apart from the inevitable impurities.

According to the present invention, the ceramic material constituting the ceramic body is in principle not porous.

However, according to certain embodiments, said material may have a porosity which in principle does not exceed 5% by volume, or which does not exceed 1% by volume, calculated according to the ratio expressed as a percentage of the bulk density measured according to ISO18754 to the true density measured according to ISO5018. The porosity is equal to 100−R (%) where R (%) is the ratio expressed as a percentage of the bulk density to the true density.

Whatever the porosity of the material, according to the present invention, the percentages by volume of the various constituents of the material are given excluding porosity.

The contents of boron carbide, silicon carbide and metallic silicon phase or metallic phase (s) containing silicon in the material are obtained by ray diffraction, according to techniques well known in the art.

Boron carbide is understood to mean the sum of all the detectable crystalline forms, in particular detectable by X-ray diffraction, present in the material and comprising boron and carbon, in particular of course $B_4C$ but also other forms, in particular resulting from the high-temperature decomposition thereof, such as the $B_{12}(B,C,Si)_3$ form.

The equivalent grain diameter in the material according to the invention is understood to mean the diameter of a sphere of the same volume as that measured for said grain. It is preferably determined by microtomography. The tomography analysis also makes it possible to obtain the volume distribution of the grains, as a percentage of the volume of material analyzed, as illustrated in FIG. 1 and explained in more detail in the remainder of the description.

In the armor-plating component according to the invention, according to preferred characteristics of the present invention:

said ceramic body is monolithic and has an impact area greater than 100 cm$^2$, a thickness greater than 3 mm and a bulk density less than 3.0 g/cm$^3$, said material constituting the ceramic body comprises boron carbide grains bound by a matrix, said matrix comprising a) a metallic silicon phase or a metallic phase comprising silicon, in particular in the form of an alloy of silicon with one or more other metallic elements and b) silicon carbide grains, said boron carbide grains with an equivalent diameter greater than or equal to 30 micrometers represent more than 20% by volume, preferably more than 25% by volume of said material, or more than 27% and said silicon carbide grains with an equivalent diameter greater than or equal to 10 micrometers represent more than 10% by volume of said material, and said silicon carbide grains with an equivalent diameter less than 10 micrometers represent more than 10% by volume, preferably more than 15% by volume of said material, silicon carbide grains with an equivalent diameter greater than or equal to 10 micrometers and less than 60 micrometers represent more than 10% by volume of said material, preferably more than 13% of the volume of the material, the silicon carbide grains with an equivalent diameter greater than 60 micrometers represent less than 5%, preferably less than 2%, or less than 1% of the volume of said material, the silicon carbide grains with an equivalent diameter greater than or equal to 10 micrometers and less than 60 micrometers represent less than 25%, more preferably less than 20% of the volume of said material, the silicon carbide grains with an equivalent diameter less than 10 micrometers represent less than 55%, more preferably less than 50% of the volume of said material, the boron carbide grains with an equivalent diameter less than or equal to 5 micrometers represent less than 10% by volume of said material, preferably less than 5% by volume of said material, or less than 1% of the volume of said material, the silicon carbide grains with an equivalent diameter less than 5 micrometers, in particular in alpha (α) crystallographic form, represent more than 10% by volume of said material, and more preferably more than 15%, or even more than 20%, or more than 25% by volume of said material, the silicon carbide grains with an equivalent diameter greater than or equal to 60 micrometers represent less than 10% by volume of said material, preferably less than 5% by volume of said material, or less than 1% of the volume of said material, the silicon carbide grains with an equivalent diameter greater than 5 micrometers consist essentially of SiC in alpha form, the grains, in particular of boron carbide or of silicon carbide, in the material constituting the ceramic body have an equivalent diameter less than 150 micrometers, preferably less than 100 micrometers, more than 90% by volume of the grains of said material, the equivalent diameter of which is greater than 60 micrometers, are boron carbide grains, the metallic silicon phase or a metallic phase comprising silicon consists essentially of silicon (Si), the volume content of silicon carbide in said material, measured by X-ray diffraction, is greater than 25%, more preferably greater than 30%, preferably greater than 40% of the crystalline phases present in said material, the volume content of silicon carbide in said material, measured by X-ray diffraction, is less than 70%, preferably less than 65% of the crystalline phases present in said material, the volume content of boron carbide in said material, measured by X-ray diffraction, is greater than 25%, or even greater than or equal to 27%, of the crystalline phases present in said material constituting the ceramic body, the volume content of boron carbide in said material, measured by X-ray diffraction, is less than 60%, preferably less than 50%, or less than 40%, of the crystalline phases present in said material, the volume content of metallic silicon or of metallic phase comprising silicon, measured by X-ray diffraction, is greater than 5%, preferably greater than 10%, of the crystalline phases present in said material, the content of metallic silicon or of metallic phase comprising silicon, measured by X-ray diffraction, is less than or equal to 25%, or less than 20% by volume of the crystalline phases present in said material, the boron carbide, silicon carbide and metallic silicon or metallic phase comprising silicon together represent more than 50%, preferably more than 70%, more preferably more than 80%, or more than 90%, by volume, of the crystalline phases present in said material, said material constituting the ceramic body has a porosity (as measured as the ratio expressed as a percentage of the bulk density measured by ISO18754 (cf. page 22)

to the true density measured according to ISO5018), of less than 3%, more preferably less than 2% or even less than 1%, said ceramic body has a bulk density of less than 2.95 g/cm$^3$, said ceramic body has an area greater than 150 cm$^2$, greater than 500 cm$^2$, or else greater than 1000 cm$^2$, said ceramic body has a thickness greater than 4 mm, more preferably greater than 5 mm and/or less than 50 mm, preferably less than 30 mm, the ceramic body has a mass-to-area or surface density ratio, measured in kg/m$^2$, of less than 100, preferably of less than 50, the ceramic body may have a flat surface or a surface with one or more curvatures. The ceramic body may be a simple or complex shape, solid or having a cavity, such as for example a tube. Preferably, the ceramic body is chosen from a plate, a chest protector, a helmet, a bodywork element of a vehicle, a tube.

According to particular configurations of the armor-plating component according to the invention having given good results in ballistic tests, by volume of said material:

the silicon carbide (SiC) content of said material is greater than 30% and less than 70%, more preferably is greater than 40%, or greater than 45% and less than 65%, the boron carbide content is greater than 20% and less than 50%, more preferably is greater than 25% and less than 40%, the content of metallic silicon or of the metallic phase comprising silicon is greater than 8% and less than 25%, more preferably as greater than 10% and less than 20%, the boron carbide grains with an equivalent diameter greater than 30 micrometers represent more than 20% and less than 50%, and more preferably represent more than 25% and less than 40%, the silicon carbide grains with an equivalent diameter between 10 micrometers and 60 micrometers represent more than 10% and less than 20%, and more preferably represent more than 10% and less than 19%, the silicon carbide grains with an equivalent diameter less than 10 micrometers represent more than 25% and less than 60%, and more preferably represent more than 30% and less than 55%, the boron carbide grains with an equivalent diameter greater than 60 micrometers represent more than 15% and less than 30%, more than 80%, more preferably more than 90% of the grains with an equivalent diameter greater than 60 micrometers are boron carbide grains.

The antiballistic armor-plating component, having an impact area, in particular that is flat or curved, and comprising a ceramic body made of a hard material as described above, provided on its inner face or face opposite the impact face with an energy-dissipating back coating, preferably made of a material of lower hardness than that of the material constituting the ceramic body.

the constituent material of the back coating is chosen from the polyethylenes PE, in particular ultra-high-density polyethylenes (UHMPE), glass or carbon fibers, aramids, metals such as aluminum, titanium or alloys thereof or steel;

the ceramic body-back coating assembly is surrounded by an envelope of a confining material;

the constituent material of the envelope is chosen from the polyethylenes PE, in particular ultra-high-density polyethylenes (UHMPE), glass or carbon fibers, aramids, metals such as aluminum or steel.

The invention also relates to the ceramic body, the features of which have just been described above, and in particular to a monolithic ceramic body in the form of a plate, having an area greater than 100 cm$^2$ and a thickness greater than 3 mm, a bulk density lower than 3.0 g/cm$^3$, consisting of a material as described above.

The invention also relates to the use of an armor-plating component comprising a ceramic body, the characteristics of which have just been described above, as antiballistic protection for a person, a vehicle (land, sea or air) or a fixed installation (in particular a building, enclosure wall or guard post).

Without having to repeat here, for the sake of conciseness, all of the technical features already described above in relation to the armor-plating range, a ceramic body according to the invention of course covers all of the same preferred embodiments.

The following designations and definitions are given, in connection with the preceding description of the present invention:

A hard material is understood in particular to mean a ceramic material with a Vickers hardness of greater than 15 GPa measured for example according to ASTM C1327, giving it in particular antiballistic properties.

The equivalent grain diameter in the material according to the invention is understood to mean the diameter of a sphere of the same volume as that measured for said grain. It is preferably determined by microtomography.

For example, a sample of dimensions 1.5×1.5×8 mm$^3$ is scanned in a nanofocus tomograph so as to bring the sample as close as possible to the source and thus obtain a high resolution of the order of 1 μm$^3$/voxel. An acquisition time of about 3 h makes it possible to obtain a reconstruction with little noise. The volume image obtained consisting of different gray levels is binarized, for example using IMorph software, in order to individualize the grains, the metallic phase and the possible porosity. The identification of the grains may also be carried out by techniques such as a scanning electron microscope by backscattered electron analysis or by energy dispersive X-ray spectroscopy (EDS). From the volume of each grain, it is possible to produce a volume distribution of the grains as a percentage of the volume of material analyzed apart from its porosity). It as also possible to calculate the volume of the metallic phase as a percentage of the volume of material analyzed.

In the present application, the percentage by volume of grains is expressed relative to the volume of material excluding its porosity.

The bulk density of a product is understood, within the meaning of the present invention, to mean the ratio equal to the mass of the product divided by the volume that said product occupies. It is conventionally determined by the Archimedes method. ISO 5017 or ISO 18754 specify for example the conditions for such a measurement. This standard also makes it possible to measure the open porosity within the meaning of the present invention.

A "matrix" of the ceramic body is understood to mean a crystalline or noncrystalline phase which provides a substantially continuous structure between the grains and which is obtained, during sintering or firing, from the constituents of the starting feedstock and potentially from the constituents of the gaseous environment of this starting feedstock. A matrix substantially surrounds the grains of the granular fraction, i.e. it coats them.

In a sintered ceramic body according to the invention, the grains bound by the matrix have an equivalent diameter greater than or equal to 60 µm are essentially, or even exclusively, boron carbide grains. In particular, according to the invention, the boron carbide grains may preferably represent more than 75%, more than 80%, or more than 90% by volume of the grains having an equivalent diameter greater than or equal to 60 µm.

During sintering, they substantially retain the shape and the chemical properties that they had in the starting feedstock. In the sintered ceramic body, the matrix and the grains together represent 100% of the mass of the product.

A matrix obtained by reactive sintering exhibits distinctive features. In particular, during reactive sintering, carburization of the infiltration metal occurs. The resulting increase in volume, typically from 1% to 30%, advantageously makes it possible to compensate for the shrinkage caused by the sintering of the grains. The infiltration of silicon or alloys thereof also makes it possible to fill the porosity of the green preform.

The phase composition of the constituent material of the monolithic ceramic body is normally obtained by X-ray diffraction and Rietveld analysis.

The expressions "containing a", "comprising a" or "having a" are understood to mean "comprising at least one", unless otherwise indicated.

Unless otherwise indicated, in the present description, all of the percentages are percentages by weight.

The product according to the invention makes it possible in particular to protect against any type of projectile, for example a bullet, a shell, a mine or an element thrown out during the detonation of explosives, such as bolts, nails (or IED for "improvised explosive device") and normally constitutes an armor component for people or vehicles, generally in the form of modules such as plates.

According to the invention, the protective component conventionally comprises at least two layers: a first ceramic part such as described above combined with another, less hard and preferably ductile, material on the back face, conventionally referred to as "backing", such as polyethylene (e.g. Tensylon™, Dyneema®, Spectra™) fibers, aramid (e.g. Twaron™, Kevlar®) fibers, glass fibers, or metals such as for example steel or aluminum alloys, in the form of plates. Adhesives, for example based on polyurethane or epoxide polymers, are used to bond the various constituent elements of the armor plate.

Under the impact of projectiles, the ceramic material fragments and its main purpose is to break the cores of the projectiles. The purpose of the back face, associated with the constituent ceramic material of the ceramic body, is to absorb the kinetic energy of the debris and to maintain a certain level of confinement on the ceramic plate, which is further optimized by the confining envelope.

A ceramic body according to the invention may in particular be obtained by means of a sintering process, in particular a reactive sintering process comprising the following steps:

a) preparing a starting feedstock including:
  at least one powder of boron carbide particles, of which the median diameter of the particles is between 30 micrometers and 150 micrometers,
  a first powder of silicon carbide particles, of which the median diameter of the first powder of particles is at least 1.5 times smaller than the median diameter of boron carbide grains and preferably less than 3.5 times smaller than the median diameter of boron carbide grains,
  a second powder of silicon carbide particles, of which the median diameter is at least 5 times smaller than the median diameter of the first powder of silicon carbide particles, and preferably less than 15 times smaller than the median diameter of the first powder of silicon carbide particles,
  an aqueous solvent, in particular deionized water,
  optionally, a carbon precursor, preferably a powder of graphite or of non-crystalline or amorphous carbon,
  preferably, shaping additives,
b) shaping the starting feedstock into the form of a preform;
c) removal from the mold after setting or drying;
d) optionally, drying the preform, preferably until the residual moisture content is comprised between 0 and 0.5% by weight;
e) loading the preform, in contact with a source of silicon or a silicon alloy, preferably in solid form, into a furnace;
f) firing the preform under an inert atmosphere, preferably under argon, or under vacuum, preferably under a residual pressure of less than 20 torr, preferably less than 15 torr, preferably at a temperature between 1450° C. and 2200° C., so as to infiltrate the preform with the source of molten silicon and consolidate said preform.

Preferably, the median diameter of the particles of the initial boron carbide powder is between 40 and 90 micrometers and more preferably is between 50 and 80 micrometers. Preferably, the median diameter of the first powder of silicon carbide particles is at least two times smaller than the median diameter of the powder of boron carbide grains.

In such a process, use is made of a first initial silicon carbide powder, the median diameter of the particles of which is between 10 micrometers and 50 micrometers, and preferably between 15 and 30 micrometers. In certain advantageous embodiments, this first silicon carbide powder has at least 10% of grains greater than 5 micrometers and less than 10% of grains greater than 50 micrometers. Preferably, the median diameter of the second powder of silicon carbide particles is at least ten times smaller than the median diameter of the first powder of silicon carbide particles.

Preferably, the median diameter of the particles of the second silicon carbide powder is between 0.5 micrometers and 5 micrometers, and preferably is between 1 and 4 micrometers, more preferably between 2 and 3 micrometers.

According to a preferred embodiment, the starting feedstock comprises by mass:
  from 30% to 50% of a powder of boron carbide grains, the median diameter of which is between 40 and 90 micrometers and preferably between 50 and 80 micrometers, and
  from 10% to 30% of a first powder of silicon carbide grains, the median diameter of which is between 10 micrometers and 50 micrometers and preferably between 15 and 30 micrometers,
  from 30% to 50% of a second powder of silicon carbide grains, the median diameter of which is between 0.5 micrometers and 5 micrometers, and preferably between 1 and 4 micrometers, more preferably between 2 and 3 micrometers.

According to a preferred embodiment, the starting feedstock comprises, by mass, less than 5% of a carbon precursor, preferably a powder of graphite or of noncrystalline or amorphous carbon.

According to a preferred embodiment, the addition of additives and of carbon precursors is such that the free carbon content of the preform before firing, i.e. the content of unbound carbon in the form of a carbide, measurable by example according to standard ANSI B74-151992 (R2000), is less than 10%, preferably less than 5% of the mass of said preform.

In step b), the preform can be obtained by casting or by pressing the feedstock or the mixture in a mold, with or without vibration, preferably by casting.

During the firing in step f), the source of molten silicon infiltrates the preform and reacts ("reactive sintering") with some of constituents, in particular with the carbon present due to impurities or intentional additions, to form a metal matrix and thus bind the boron carbide grains and the silicon carbide grains of the ceramic body.

According to a particular embodiment, the maximum firing temperature of the preform is between 1450° C. and 1800° C. under vacuum.

According to another particular embodiment, the maximum firing temperature of the preform is between 1700° C. and 2200° C., preferably between 1700° C. and 1900° C. under standard pressure of inert or neutral gas, for example under argon.

In the ceramic body according to the invention, the ceramic grains, preferably silicon carbide and boron carbide grains, can be bound by a matrix comprising or consisting essentially of a silicon phase without addition of other compounds.

The median diameter of the particles (or the median "size") of the particles constituting a powder, is given within the meaning of the present invention by characterization of the particle size distribution, in particular by means of a laser particle sizer. The particle size distribution is conventionally characterized using a laser particle sizer according to the ISO 13320-1 standard. The laser particle sizer may, for example, be a Partica LA-950 from Horiba. Within the meaning of the present description and unless otherwise indicated, the median diameter of the particles refers to the diameter of the particles below which 50% by mass of the population is found, respectively. The "median diameter" or "median size" of an assembly of particles, in particular of a powder, refers to the $D_{50}$ percentile, i.e. the size that divides the particles into first and second populations of equal volume, these first and second populations only comprising particles having a size greater than or less than the median size, respectively.

In one embodiment, the starting feedstock contains a binder and/or a lubricant and/or a surfactant and/or a dispersant. In one embodiment, the starting feedstock contains a binder and a dispersant.

Mixing is carried out so as to obtain a high degree of uniformity of distribution of the various elements, it being possible to adjust the mixing time in order to achieve this result.

Preferably, the mixing of the initial reactants is carried out in a jar mill, the mixing time being longer than 15 hours. A mixing time of 24 hours is highly suitable. Once the mixture has been obtained, it may be atomized or granulated, for example by freeze granulation, in order to obtain granules that will be shaped, for example by pressing, so as to obtain a ceramic preform. Other shaping techniques may be used, such as injection or barbotine casting. After shaping, the preform may be machined.

Preferably, the elemental oxygen content of the silicon carbide powders and/or boron carbide powders is lower than 2%, preferably lower than 1.6%, preferably lower than 1.4%, preferably lower than 1.2%, preferably lower than 1%, or lower than 0.7%, or lower than 0.5%, or even lower than 0.3% by weight. In one embodiment, the elemental oxygen content of these powders may be decreased before use by means of any technique known to those skilled in the art, for example acid washing.

The term "sintering" refers to a heat treatment via which the product forms a microstructure consisting of a granulate or granular fraction, the grains of which are held together by means of a matrix. A sintered product according to the invention comprises a matrix containing at least one metallic silicon phase or a metallic silicon alloy, obtained by sintering in a neutral atmosphere or under vacuum.

The term "impurities" is understood to mean the unavoidable constituents, unintentionally and inevitably introduced with the raw materials or resulting from reactions with these constituents. The impurities are not necessary constituents, but merely tolerated constituents. Such an impurity consists in particular of silica, boron oxide, iron or oxides thereof. Without departing from the scope of the invention, it is possible to limit the silica impurity by washing the SiC powders or the sintering additive in a prior step and/or by adding, carbon-containing additives to the initial mixture, to remove it during sintering.

FIG. 1 is an image taken with a scanning microscope of a polished section of the hard material of example 1 according to the invention. The hard material comprises boron carbide grains 1, bound by a matrix comprising a metallic silicon phase 2, in which a first intermediate fraction of silicon carbide grains 3 and a second fraction of silicon carbide grains 4 are distinguished.

EXAMPLES

The following examples are given purely by way of illustration and do not limit, under any of the described aspects, the scope of the present invention.

In all the examples which follow, ceramic parts in the form of plates having a 100 mm×100 mm format with a thickness of 7 to 10 mm were initially produced by casting, in a plaster mold, a suspension according to the process described above and the formulations described in table 1 below. After casting and hardening of the paste, the parts were removed from the mold and then dried for 24 h at 110° C. The parts were then introduced into a furnace for firing at 1700° C. under vacuum, at a pressure below 20 torr. The silicon was introduced from a powder placed in contact with the green parts during furnace charging. The amount of silicon representing about 45% of the dry green mass of the parts. Representative comparative example 6 was according to the teaching of example 1 of U.S. Pat. No. 6,862,970B2. The firing for this example was carried out at 1550° C. in contrast to the other examples.

For each embodiment, the properties of the ceramic body and the composition of the various constituent materials thereof are collated in table 2.

For each example, eight ceramic plates obtained according to the process described above having a surface density of 22.5 kg/m² (±0.5 kg/m²) were adhesively bonded to metal plates of 7020 T6 aluminum of 200 mm×200 mm×5 mm.

The surface density $\rho_{at}$ is calculated according to the following formula $\rho_{at}=t\times\rho_v$ where:
  $\rho_{at}$ is the surface density expressed in kg/m²
  t is the thickness of the plate, expressed in mm
  $\rho_v$ is the bulk density expressed in kg/dm³ typically measured according to ISO 18754.

Each ceramic-metal assembly was shot from a distance of 15 meters with a 7.62×51 P80 (steel core) ammunition at various speeds. A graph representing the degree of impact or perforation (total protection at complete perforation) as a function of the impact speed for all the examples. From this graph, it is determined for each example the median velocity V50 starting from which the probability of perforation is 50%. A velocity greater than 700 m/s, taking into account this type of ammunition, is considered satisfactory. A high velocity corresponds to a ballistic performance which is inversely proportional to the surface density.

The ballistic properties of the final armor plate are collated in table 3.

The results are given in the following tables:

TABLE 1

|  | invention example 1 | invention example 2 | invention example 3 | comparative example 1 | comparative example 2 | comparative example 3 | comparative example 4 | comparative example 5 | comparative example 6 |
|---|---|---|---|---|---|---|---|---|---|
| Composition of the initial mixture (% by weight) | | | | | | | | | |
| B4C powder $D_{50}$ = 70 μm $D_{10}$ = 47 μm $D_{90}$ = 105 μm | 41 | 30 | 41 | 25 | 30 | 70 | 0 | 0 | 46.3 |
| B4C powder $D_{50}$ = 5 μm | 0 | 0 | 0 | 0 | 0 | 0 | 30 | 0 | 0 |
| SiC powder $D_{50}$ = 80 μm $D_{10}$ = 53 μm $D_{90}$ = 120 μm | 0 | 0 | 0 | 0 | 15 | 0 | 15 | 45 | 0 |
| SiC powder $D_{50}$ = 27 μm $D_{10}$ = 18 μm $D_{90}$ = 40 μm | 15 | 15 | 30 | 20 | 0 | 27 | 0 | 0 | 0 |
| SiC powder $D_{50}$ = 13 μm $D_{10}$ = 8.5 μm $D_{90}$ = 17.5 μm | 0 | 0 | 0 | 0 | 0 | 0 | 0 | 0 | 46.3 |
| SiC powder 0.1-5 μm $D_{50}$ = 2.5 μm $D_{10}$ = 0.5 μm $D_{90}$ = 7 μm | 41 | 50 | 26 | 50 | 50 | 0 | 55 | 50 | 0 |
| % added carbon (fructose) | 0 | 0 | 0 | 0 | 0 | 0 | 0 | 0 | 7.4 |
| Graphite powder $D_{50}$ = 0.7 μm $D_{10}$ = 0.4 μm $D_{90}$ = 1.0 μm | 3 | 5 | 3 | 5 | 5 | 3 | 0 | 5 | 0 |
| total minerals % | 100 | 100 | 100 | 100 | 100 | 100 | 100 | 100 | 100 |
| % added water relative to the mass of minerals | 18 | 18 | 18 | 18 | 18 | 18 | 18 | 18 | 26 |
| Added binder + dispersant | 0.5 | 0.5 | 0.5 | 0.5 | 0.5 | 0.5 | 0.5 | 0.5 | 0.5 |

TABLE 2

|  | Inv. example 1 | Inv. example 2 | Inv. example 3 | Comp. example 1 | Comp. example 2 | Comp. example 3 | Comp. example 4 | Comp. example 5 | Comp. example 6 |
|---|---|---|---|---|---|---|---|---|---|
| Body/ceramic material characteristics after firing Microstructural characteristics (vol % of the product excluding porosity) | | | | | | | | | |
| Fraction of boron carbide grains* ≥30 μm | 35 | 28 | 34 | 24 | 39 | 52 | <1 | <1 | 43 |
| Fraction of boron carbide grains* <5 μm | <1 | <1 | <1 | <1 | <1 | <1 | 19 | <1 | <1 |
| Fraction of boron carbide grains* ≥60 μm | 23 | 19 | 22 | 15 | 26 | 35 | 0 | 0 | 28 |

TABLE 2-continued

|  | Inv. example 1 | Inv. example 2 | Inv. example 3 | Comp. example 1 | Comp. example 2 | Comp. example 3 | Comp. example 4 | Comp. example 5 | Comp. example 6 |
|---|---|---|---|---|---|---|---|---|---|
| Percentage by volume of boron carbide grains among the grains ≥60 μm | 99 | 99 | 99 | 99 | 72 | 99 | 0 | 0 | 99 |
| Fraction of silicon carbide grains* ≥60 μm | <1 | <1 | <1 | <1 | 10 | <1 | 8 | 35 | <1 |
| Fraction of silicon carbide grains* ≥10 μm and <60 μm | 13 | 14 | 25 | 19 | <1 | 13 | 2 | 7 | 28 |
| Fraction of silicon carbide grains* <10 μm | 35 | 47 | 21 | 47 | 40 | 10 | 36 | 46 | 9 |
| Fraction of a SiC grains* <5 μm | 30 | 40 | 18 | 40 | 34 | <1 | 31 | 39 | <1 |
| Porosity % | <1 | <1 | <1 | <1 | <1 | <1 | <1 | <1 | <1 |
| Bulk density g/cm$^3$ | 2.82 | 2.92 | 2.82 | 2.95 | 2.87 | 2.63 | 2.81 | 3.10 | 2.73 |
| X-ray diffraction analysis (vol %) | | | | | | | | | |
| Silicon carbide SiC (α and β) forms) | 48 | 61 | 46 | 65 | 53 | 23 | 46 | 88 | 37 |
| Boron carbide phases, in particular B$_4$C and B$_{12}$(B, C, Si)$_3$ | 35 | 28 | 34 | 23 | 39 | 52 | 36 | 0 | 43 |
| Metallic Si | 17 | 11 | 20 | 12 | 9 | 25 | 18 | 12 | 20 |

TABLE 3

|  | Inv. example 1 | Inv. example 2 | Inv. example 3 | Comp. example 1 | Comp. example 2 | Comp. example 3 | Comp. example 4 | Comp. example 5 | Comp. example 6 |
|---|---|---|---|---|---|---|---|---|---|
| Ballistic tests | | | | | | | | | |
| Median velocity V$_{50}$ (m/s) for a surface density of 22.5 kg/dm$^2$ | 800 | 780 | 760 | 740 | 730 | 700 | 750 | 760 | 730 |

The results grouped together in table 3 indicate that the choice of materials used to manufacture an armor-plating component, i.e. of which the volume fractions of boron carbide grains, of silicon carbide grains and of the silicon-based metallic phase are in accordance with the present invention, lead to improved antiballistic performance (higher velocity V$_{50}$, at equal surface density).

The invention claimed is:

1. An antiballistic armor-plating component, comprising a ceramic body made of a material comprising, as percentages by volume:
   between 20% and 75% of boron carbide,
   between 5% and 30% of a metallic silicon phase or of a metallic phase comprising silicon,
   between 20% and 70% of silicon carbide,
and wherein, as percentages by volume:
   more than 60% of the grains with an equivalent diameter greater than 60 micrometers are boron carbide grains,
   the boron carbide grains with an equivalent diameter greater than 30 micrometers represent more than 20%,
   the silicon carbide grains with an equivalent diameter greater than or equal to 10 micrometers represent more than 10%, and
   the silicon carbide grains with an equivalent diameter less than 10 micrometers represent more than 10%.

2. The antiballistic armor-plating component as claimed in claim 1, wherein said ceramic body is monolithic and has an impact area greater than 100 cm$^2$, a thickness greater than 3 mm and a bulk density less than 3.0 g/cm$^3$.

3. The antiballistic armor-plating component as claimed in claim 1, wherein the silicon carbide grains with an equivalent diameter greater than or equal to 10 micrometers and less than 60 micrometers represent more than 10% by volume of said material.

4. The antiballistic armor-plating component as claimed in claim 1, wherein the silicon carbide grains with an equivalent diameter less than 10 micrometers represent less than 55% by volume of said material.

5. The antiballistic armor-plating component as claimed in claim 1, wherein the silicon carbide grains with an equivalent diameter greater than or equal to 60 micrometers represent less than 10% by volume of said material.

6. The antiballistic armor-plating component as claimed in claim 1, comprising:
boron carbide grains,
a matrix binding said boron carbide grains,
said matrix comprising at least a) a metallic silicon phase or a metallic phase comprising silicon and b) silicon carbide grains.

7. The antiballistic armor-plating component as claimed in claim 1, wherein the boron carbide grains with an equivalent diameter less than or equal to 5 micrometers represent less than 10% by volume of said material.

8. The antiballistic armor-plating component as claimed in claim 1, wherein the silicon carbide grains with an equivalent diameter less than 5 micrometers, in alpha (α)crystallographic form, represent at least 20% by volume of said material.

9. The antiballistic armor-plating component as claimed in claim 1, wherein the boron carbide grains with an equivalent diameter greater than 60 micrometers represent more than 15% and/or less than 40% by volume of said material.

10. The antiballistic armor-plating component as claimed in claim 1, wherein the silicon carbide content of said material is greater than 30% and/or less than 65% by volume of said material.

11. The antiballistic armor-plating component as claimed in claim 1, wherein the boron carbide content is greater than 25% and/or less than 60% by volume of said material.

12. The antiballistic armor-plating component as claimed in claim 1, wherein the boron carbide, the silicon carbide and the metallic silicon or the metallic phase comprising silicon together represent more than 75%, by volume, of said material.

13. The antiballistic armor-plating component as claimed in claim 1, wherein, by volume of said material:
the silicon carbide content of said material is greater than 30% and less than 70%, and
the boron carbide content is greater than 20% and less than 50%, and
the content of metallic silicon or of the metallic phase comprising silicon is greater than 8% and less than 25%, and
the boron carbide grains with an equivalent diameter greater than 30 micrometers represent more than 20% and less than 50%, and
the silicon carbide grains with an equivalent diameter between 10 micrometers and 60 micrometers represent more than 10% and less than 20%, and
the silicon carbide grains with an equivalent diameter less than 10 micrometers represent more than 25% and less than 60%, and
the silicon carbide grains with an equivalent diameter less than 5 micrometers represent less than 5%,
the boron carbide grains with an equivalent diameter greater than 60 micrometers represent more than 15% and less than 30%, and
more than 80% of the grains with an equivalent diameter greater than 60 micrometers are boron carbide grains.

14. The antiballistic armor-plating component as claimed in claim 1, wherein the ceramic body has a mass-to-area ratio, or surface density, measured in kg/m$^2$, of less than 100.

15. The antiballistic armor-plating component as claimed in claim 1, wherein the ceramic body is chosen from a plate, a chest protector, a helmet, a bodywork element of a vehicle, a tube.

16. The antiballistic armor-plating component as claimed in claim 1, comprising a ceramic body made of a material, provided on its inner face or face opposite the impact face with an energy-dissipating back coating, made of a material of lower hardness than that of the material constituting the ceramic body, wherein the material constituting the back coating is chosen from polyethylenes PE, glass or carbon fibers, aramids, or metals.

17. The antiballistic armor-plating component as claimed in claim 16, wherein the ceramic body-back coating assembly is surrounded by an envelope of a confining material.

18. The antiballistic armor-plating component as claimed in claim 17, wherein the material constituting the envelope is chosen from polyethylenes PE, glass or carbon fibers, aramids, or metals.

19. A process for manufacturing the ceramic body of the armor-plating component as claimed in claim 1 comprising:
a) preparing a starting feedstock including:
at least one powder of boron carbide particles, of which a median diameter of the particles is between 30 micrometers and 150 micrometers,
a first powder of silicon carbide particles, of which a median diameter of the first powder of particles is at least 1.5 times smaller than the median diameter of boron carbide grains,
a second powder of silicon carbide particles, of which a median diameter is at least 5 times smaller than the median diameter of the first powder of silicon carbide particles,
an aqueous solvent,
optionally, a carbon precursor,
optionally, shaping additives,
b) shaping the starting feedstock into the form of a preform;
c) removal from a mold after setting or drying;
d) optionally, drying the preform;
e) loading the preform, in contact with a source of silicon or a silicon alloy into a furnace;
f) firing the preform under an inert atmosphere or under vacuum, so as to infiltrate the preform with the source of molten silicon and consolidate it.

20. A method comprising providing an antiballistic protection for a person or for a land, sea or air vehicle or for a fixed installation with the antiballistic armor-plating component as claimed in claim 1.

* * * * *